(12) United States Patent
Huemiller, Jr.

(10) Patent No.: US 7,475,385 B2
(45) Date of Patent: Jan. 6, 2009

(54) COOPERATING TEST TRIGGERS

(75) Inventor: Louis D. Huemiller, Jr., San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 671 days.

(21) Appl. No.: 10/954,771

(22) Filed: Sep. 29, 2004

(65) Prior Publication Data

US 2006/0085716 A1 Apr. 20, 2006

(51) Int. Cl.
G06F 9/44 (2006.01)
G06F 11/00 (2006.01)

(52) U.S. Cl. .......................... 717/127; 717/126; 714/38

(58) Field of Classification Search ................. 717/126, 717/127; 711/150; 710/200, 240; 714/55
See application file for complete search history.

(56) References Cited

U.S. PATENT DOCUMENTS

2003/0131168 A1* 7/2003 Kauffman et al. ........... 710/244
2004/0210723 A1* 10/2004 Naruse et al. ............... 711/150

* cited by examiner

Primary Examiner—Eric B Kiss

(57) ABSTRACT

In an embodiment of the invention, a method for providing cooperating triggers, includes: determining if a match criteria for a slave trigger and a match criteria for a primary trigger are met; executing the slave trigger and the primary trigger if the match criteria are met; and waiting for a transition in a total number of shots taken by the primary trigger so that the slave trigger performs synchronization spinning. The primary trigger and the slave trigger can then perform post synchronization spinning.

22 Claims, 4 Drawing Sheets

COOPERATING TEST TRIGGERS

TECHNICAL FIELD

Embodiments of the present invention relate generally to computer systems, and more particularly to cooperating test triggers.

BACKGROUND

On a computer system, nearly all aspects of process execution are managed by the operating system kernel which is the software forming the core or heart of an operating system. For example, the kernel is responsible for scheduling the execution of processes and managing the resources made available to and used by the processes. Processes may be typical programs such as, for example, word processors, spreadsheets, games, or web browsers, or other programs. Processes may also be underlying tasks executing to provide additional functionality to either the operating system or to the user of the computer. Processes may also be additional processes of the operating system for providing various functionalities to other parts of the operating system. These functionalities include, for example, networking functionality and/or file sharing functionality.

The kernel also has the responsibility of controlling access by multiple processes that are running in a computer and that are accessing a shared resource, so that the processes do not simultaneously use the shared resource and do not cause a fault in the kernel. As an example, a shared resource may be an available physical memory to be used by a process.

Various mechanisms may be used to control access to a shared resource. The prior solution in the execution of multiple processes has been to use a shared variable in a shared resource between the two processes. One of the processes is made to spin until the process sees the value of the variable change, while the other process changes the contents of the variable. As known to those skilled in the art, when a process spins, the process simply waits in a loop and repeatedly performs a check for a lock to become available. As also known to those skilled in the art, a lock is a mechanism for enforcing limits on access to a resource in an environment where there are many threads of execution. Locks are one way of enforcing concurrency control policies. Threads are similar to processes, since both represent a single sequence of instructions executed in parallel with other sequences. Threads permit a program to split itself into two or more simultaneously executing tasks. As an example, one thread may monitor a graphical user interface, while other threads may perform a long calculation in the background. As a result, the application more readily responds to the user's interaction. Multiple threads typically share a memory and other resources directly. On operating systems that have special facilities for threads, it is typically faster for the operating system to context switch between different threads in the same process than to switch between different processes.

A test for proper locking is required in order to detect for any missing locks or misplaced locks. Improper locking introduces an opportunity for a failure if dependent code paths execute at the same time. Programmers go to extraordinary measures to eliminate these failure opportunities which are known as locking windows.

A missing lock situation typically occurs when the code programmer does not code a lock between multiple dependent processes. As a result, each process will execute its task while ignoring the other process or processes. Missing locks are detected by use of a testing method that use the "butterfly testing pattern".

In prior methods, a broad butterfly testing method is used, where random skew patterns are used. However, the test coverage in these prior method is not sufficiently broad because the set of skew values is few in number.

A misplaced lock situation occurs when the step of obtaining or releasing a lock by a process is placed in an incorrect statement in the code. As an example, if the lock is misplaced, then a process might release the lock prior to the correct release step. Misplaced locks can be detected based on abrupt changes in behavior of the software. These abrupt changes are what are known as a "knife-edge". Testing of skew times around the knife-edge is then performed to verify a misplaced lock.

Synchronization is a prerequisite to executing two or more paths in parallel. For normal kernel behavior, syncronization is very rarely needed. Ideally the paths in a normally behaving kernel are never syncronized. Locks are used to obtain correct behavior for the rare cases where the paths by coincidence execute in parallel. As discussed below, the invention deals with forcing these rare cases to occur, for testing purposes. In a normally executing system, these cases rarely occur.

Once this synchronization has occurred, both processes are made to spin a specified and perhaps a different amount of time. After completing a post synchronization spin loop, each of the processes will issue a system call that causes the execution of one of the two code paths. The disadvantage of this previous method is the lengthy code path from the system call entry to the code to be executed in parallel. Depending mostly on the number of I-cache (instruction cache) misses, the amount of time to permit the code to be executed in parallel is not deterministic. In other words, there is no guarantee that two code paths will be executed concurrently. For example, executing two code paths within about twenty (20) clocks has never been obtained by use of previous methods, even with thousands of attempts of execution. Typically, in previous methods, two code paths execute within about 500 clocks, at an occurrence of less than approximately 10% of the time.

Therefore, the current technology is limited in its capabilities and suffers from at least the above constraints and deficiencies.

SUMMARY OF EMBODIMENTS OF THE INVENTION

An embodiment of the invention provides cooperating triggers comprising a slave trigger and primary trigger with the following features. The slave trigger will perform all of the synchronization spinning. Both the primary trigger and slave trigger can perform post synchronization spinning, but this is a separate feature, used normally to skew the execution of two previously synchronized primary and slave triggers.

The slave triggers spins and watches the total number of shots taken by the primary trigger. The primary trigger takes it shots as it would if the primary trigger was a standard trigger. Part of performing this technique causes the total number of shots taken value to increase in the primary trigger. The slave trigger will synchronize on this total shots taken value in the primary trigger.

A slave trigger can also be the primary trigger of another slave trigger.

A testcase code is responsible for causing the code path that contains the slave trigger to be entered before the path that contains the primary trigger. If instead the slave trigger is entered after the primary trigger is entered, then the slave trigger will see that the primary trigger has already taken the number of shots that the slave trigger was requested to synchronize on. This is a missed synchronization condition, which is reported up to the testcase code. The testcase code can then normally retry the operation to synchronize the triggers, in order to enable the code paths to execute in the correct order.

Both the primary trigger and slave trigger can be the same trigger in the same code path. For example, a single trigger in the write system call path could be set up for both the primary trigger and slave trigger. This setup would allow for the skewed execution testing of two nearly simultaneous write system calls. Additional details on the primary and slave triggers are discussed below.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

An embodiment of the invention significantly improves the ability to test for improper locking, by using cooperating triggers to perform significant amounts of testing at skew times around the knife-edge and by using cooperating triggers at evenly spaced set of skew values where no abrupt changes in process behavior have occurred.

A code path is an instruction sequence for completing a specific task by a software program. For example, an embodiment of the invention permits execution of two code paths within approximately twenty (20) clocks of each other, at an occurrence of approximately 31% of the time. In contrast, without the cooperating test triggers in accordance with an embodiment of the invention, executing two code paths within 20 clocks of each other has never been obtained, even with thousands of attempts of execution. Therefore, an embodiment of the invention allows the deterministic testing of multi-processes correctness between two arbitrary code paths.

Figure 1:
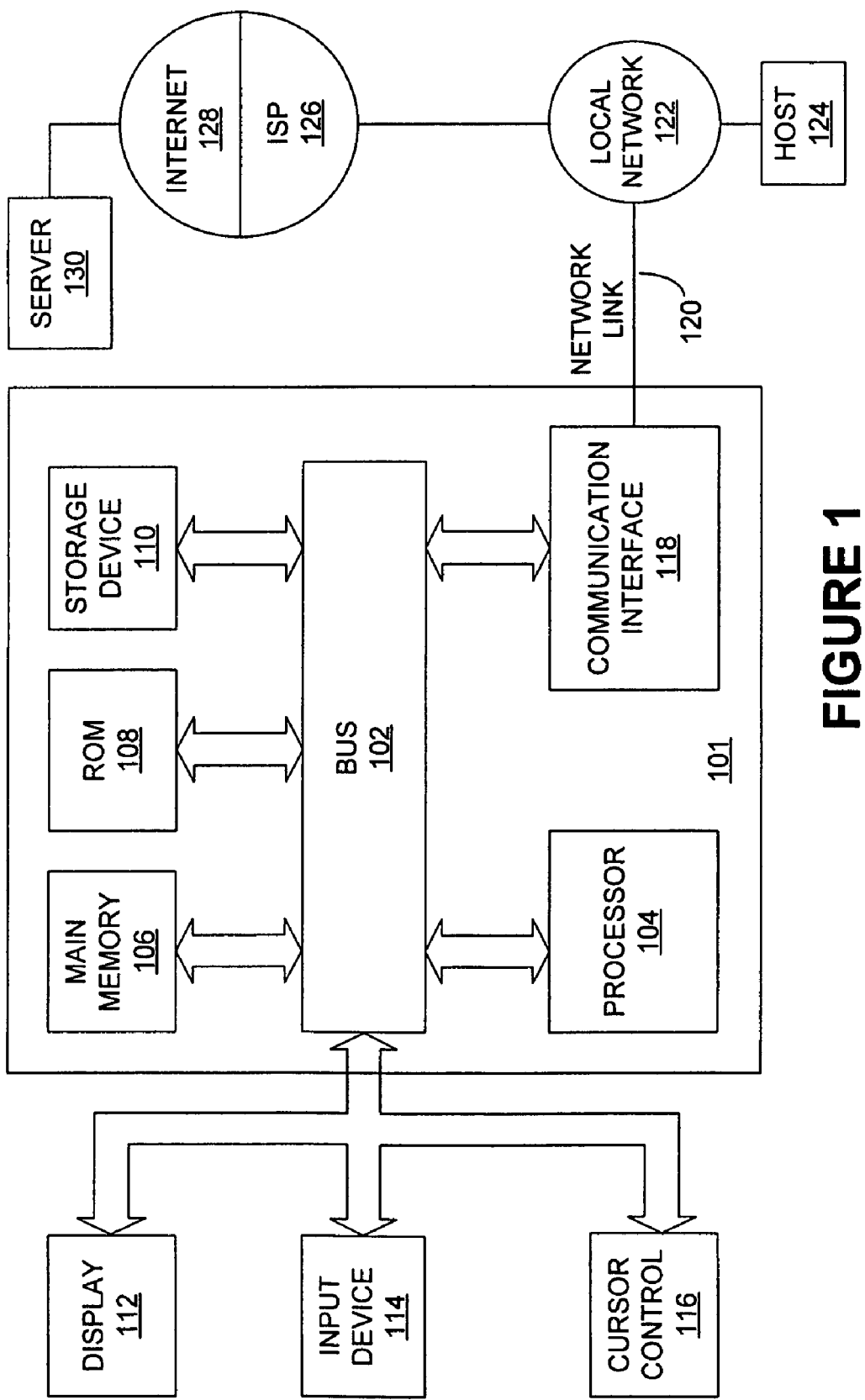
FIG. 1 is a functional block diagram of a system in accordance with an embodiment of the invention.

FIG. 1 is a block diagram illustrating an exemplary computer system 101 upon which an embodiment of the invention may be implemented. An embodiment of the invention is usable with, for example, currently available personal computers, mini-mainframes, enterprise servers, multi-processor computers, and other suitable types of computing devices.

Computer system 101 includes a bus 102 or other communication mechanism for communicating information, and a processor 104 coupled with the bus 102 for processing information. Computer system 101 also includes a main memory 106, such as, for example, a random access memory (RAM) or other dynamic storage device. The main memory 106 is coupled to the bus 102 and stores information and instructions to be executed by the processor 104. The main memory 106 may also be used for storing temporary variables or other intermediate information during the execution of instructions to be executed by processor 104. Computer system 101 further includes a read only memory (ROM) 108 or other static storage device. The ROM 108 is coupled to the bus 102 and stores static information and instructions for the processor 104. A storage device 110, such as, for example, a magnetic disk or optical disk, may be provided in the computer system 101. The storage device 110 may be coupled to the bus 102 and stores information and instructions to be executed by the processor 104.

Computer system 101 may be coupled via the bus 102 to a display 112, such as a cathode ray tube (CRT) or a flat panel display, for displaying information to a computer user. An input device 114, which may include alphanumeric and other keys, is coupled to the bus 102 for communicating information and command selections to the processor 104. Another type of user input device is a cursor control 116, such as, for example, a mouse, a trackball, or cursor direction keys for communicating direction information and command selections to processor 104 and for controlling cursor movement on the display 112. This input device 114 typically has two degrees of freedom in two axes, a first axis (e.g., x-axis) and a second axis (e.g., y-axis) allowing the device to specify positions in a plane.

An embodiment of the invention is related to the use of a computer system 101, such as the illustrated system, to provide a mechanism for providing cooperating test triggers in software and use thereof. According to one embodiment of the invention, a software trigger facility for providing cooperating test triggers is provided by the computer system 101 in response to processor 104 executing sequences of instructions contained in memory such as, for example, main memory 106. Such instructions may be read into main memory 106 from another computer-readable medium, such as the storage device 110. However, the computer-readable medium is not limited to devices such as the storage device 110.

For example, the computer-readable medium may include computer-readable storage media such as a floppy disk, a flexible disk, hard disk, magnetic tape, or any other magnetic medium, a CD-ROM (compact disk ROM), any other optical medium, punch cards, paper tape, any other physical medium with patterns of holes, a RAM (random access memory), a PROM (programmable ROM), an EPROM (erasable programmable ROM), a FLASH-EPROM, or any other suitable memory chip or cartridge. The computer-readable medium may also include computer-readable transmission media such as a carrier wave embodied in an electrical, electromagnetic, infrared, or optical signal. Execution of the sequences of instructions contained in the main memory 106 causes the processor 104 to perform the process steps described below. In alternative embodiments, hard-wired circuitry may be used in place of or in combination with computer software instructions to implement an embodiment of the invention. Thus, embodiments of the invention are not limited to any specific combination of hardware circuitry and software.

Computer system 101 also includes a communication interface 118 coupled to the bus 102. Communication interface 108 provides a two-way data communication as is known to those skilled in the art. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented to function with the computer system 101. In any such implementation, communication interface 118 sends and receives electrical, electromagnetic, or optical signals which carry digital data streams representing various types of information. Of particular note, the communications through interface 118 may permit transmission or receipt of the operating software program scheduling information. For example, two or more computer systems 101 may be networked together in a conventional manner, with each computer system 101 using the communication interface 118.

Network link 120 typically provides data communication through one or more networks to other data devices. For example, network link 120 may provide a connection through local network 122 to a host computer 124 or to a data equipment operated by an Internet Service Provider (ISP) 126. ISP 126, in turn, provides data communication services through the world wide web packet data communication services through the world wide web packet data communication network now commonly referred to as the "Internet" 128. Of course, the Internet 128 may other suitable types of data communication network such as, for example, a locally provided and maintained communication network. Local network 122 and Internet 128 both use electrical, electromagnetic, or optical signals which carry digital data streams. The signals through the various networks and the signals on network link 120 and through communication interface 118, which carry the digital data to and from computer system 101, are exemplary forms of carrier waves for transporting the information.

Computer system 101 can send messages and receive data, including program code, through the network(s), network link 120, and communication interface 118. In the Internet example, a server 130 might transmit a requested code for an application program through Internet 128, ISP 126, local network 122 and communication interface 118. In accordance with an embodiment of the invention, one such downloaded application provides for a method for providing cooperating test triggers in software, as described herein.

The received code may be executed by processor 104 as the code is received, and/or stored in storage device 110, or other non-volatile storage for later execution. In this manner, computer system 101 may obtain application code in the form of a carrier wave.

Figure 2:
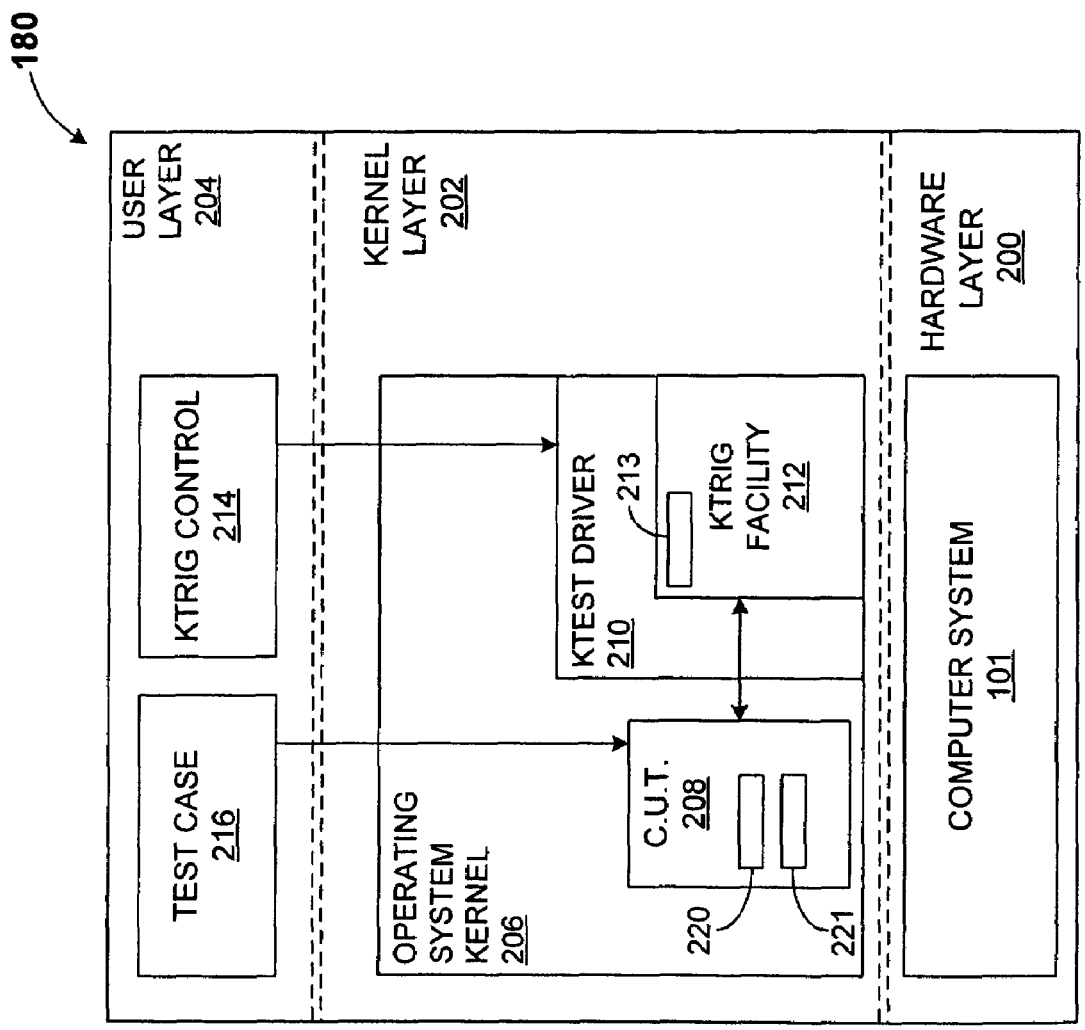
FIG. 2 is a functional block diagram of the functional layers in an embodiment of the invention.

Reference is now made to FIG. 2, which illustrates a system (apparatus) 180, in accordance with an embodiment of the invention. The system 180 includes a hardware layer 200, a kernel layer 202, and a user layer 204. The hardware layer 200 includes the computer system 101 as previously shown in FIG. 1.

The kernel layer 202 includes an operating system kernel 206. The operating system kernel 206 provides essential services such as, for example, memory management, process and task management, and disk management.

Within the kernel 206 is a portion of code (shown as code-under-test (CUT) 208) that is to be tested by a specific testcase code 216. In alternative embodiments of the invention, the CUT 208 may be a portion of code not found in the kernel layer 202, but is instead a portion of code that is found in the user layer 204 software. The user layer 204 software may be, for example, a spreadsheet, word processor, utility software, web browser, visualization, simulation, or graphics software, and/or other types of software.

Discussed below is an example of a CUT 208 that employs an embodiment of the invention. In particular, a ktrig facility 212 allows cooperating triggers (i.e., slave and primary triggers) to be located and controlled within the kernel 206. The ktrig facility 212 includes active trigger slots 213 that contain trigger attributes which are described below. A trigger is a "macro", which is an instruction that represents a sequence of simple instructions, where the instruction is inline with the rest of the program. For example, the triggers can be located and controlled within the CUT 208, in accordance with an embodiment of the invention. As an example, the triggers can be the cooperating triggers comprising a primary trigger 220 and a slave trigger 221 in CUT 208, although in other embodiments the CUT 208 may be a portion of code not necessarily found in the kernel layer 202. Additionally, both the primary trigger and slave trigger can be the same trigger in the same code path. Furthermore, the number of triggers may also be greater than two. A thread of execution enters into a trigger and spins within that trigger until another thread of execution has entered another specified trigger and has taken a specified number of shots. In other words, the slave trigger spins until the slave trigger has seen the primary trigger take a specified number of shots. A thread will execute a code path. The term "spin" is defined herein as the condition when a thread simply waits in a loop. These cooperating triggers allow two arbitrary kernel-level code paths to be synchronized together. After two or more code paths have been synchronized, each of the treads will spin for a specified and perhaps different amount of times before exiting their respective trigger. This allows the execution of the code just beyond each of the triggers to be performed at a very precise skew value from each other (e.g., 20 clocks). For example, the code paths can be synchronized within about 20 clocks at approximately 31% of the time.

A ktest driver 210 is a test driver that provides an input/output control (IOCTL) interface to the ktrig facility 212. The ktest driver 210 may be configured as part of the kernel layer 202 in order to make the cooperating test trigger facility 212 (i.e., ktrig facility 212) available to a user for testing purposes. The ktrig facility 212 interacts with the CUT 208 and a ktrig control 214, so that the ktrig facility 212 can manage the cooperating test triggers for testing the CUT 208 in accordance with a test case 216.

The ktrig facility 212 maintains a table of these active trigger slots 213. Each slot 213 describes the attributes by which a trigger will be taken (i.e., by which a trigger will execute). As an example, the active trigger slots 213 comprise a fixed-size array of 32 entries which is typically implementation dependent. Active trigger slots 213 are located in memory. In the future, embodiments of the invention may use active trigger slots 213 that comprise more than 32 entries.

In one embodiment, an active trigger slot 213 contains the following cooperating trigger related attributes as shown in Table 1:

TABLE 1 cooperating trigger attributes enCoop - Enables a cooperating trigger
coopPriSlot - index of the primaries active trigger slot
coopWaitTakenCnt - primary shots taken value that the slave trigger waits for
coopSpinTimeOut - maximum amount of time that the slave trigger waits on the primary trigger
enPostSpin - Enables post-synchronization spin processing for a trigger
postSpinTime - Amount of time after a trigger (primary trigger or slave trigger) is taken to spin The active trigger slot 213 also maintains a number of query only values that indicate conditions by which a cooperating trigger has been processed. Those values are listed in Table 2 below:

TABLE 2 cooperating trigger query values coopNumTimeOuts - Number of times that the slave trigger has waited the maximum allowed time on the primary trigger
coopMissed - a flag that is set to true if the slave trigger was entered after the primary trigger had already taken coopWaitTakenCnt shots. This occurs when the primary trigger enters before the slave trigger.
log[].coopLastChkCnt - amount of time between the slave trigger seeing a primary shots taken count less than coopWaitTakenCnt and the slave trigger saw a value >= the coopWaitTakenCnt value.
log[].postSpin - Actual amount of time spent in post-synchronization spin processing An active trigger slot indicates the matching criteria for a cooperating trigger to be taken and also describes some characteristics on the behavior of the cooperating trigger. A matching criteria also includes the trigger name and trigger number used to identify the trigger within the CUT 208.

Part of the responsibility of the ktrig facility 212 is maintaining indicators of the state of the cooperating test triggers. The ktrig facility 212 may be controlled to add triggers, delete triggers, arm or activate itself, and disarm or deactivate itself. The ktrig facility 212 may also be queried as to whether it is armed or disarmed, and queried as to the number of trigger slots 213. Additionally, a query may be made of the ktrig facility 212 to determine which trigger slots are open (i.e., slots that are not used by a trigger) and which trigger slots are closed (i.e., slots that are in use by a trigger).

The ktrig control 214 sends IOCTL requests to the kernel 206 by accessing a specific file typically called /dev/ktest (which is the file for the ktest driver 210). Those IOCTL request are passed through the kernel 206 to the ktest driver 210, which then passes the IOCTL requests to the ktrig facility 212. Although the ktrig control 214 sends the IOCTL requests to the kernel 206, those IOCTL request always end up going to the ktrig facility 212.

As mentioned above, a fixed amount of active trigger slots 213 are pre-allocated. The number of such slots 213 is determined by the implementation at compile time. One implementation has a define of 32 for the number of active trigger slots 213.

The index into the fixed array of trigger slots 213 is returned, in response to IOCTL commands. This provides for an opaque implementation, where the caller is not required to know where the active trigger slots 213 are within memory.

A single arm is made to the active trigger slots 213, which atomically arms all of the added cooperating triggers. Prior to arming the active trigger slots 213, the cooperating triggers will execute as no-operations (NOPs).

The programming environment (which includes, for example, various software shown in FIG. 2 such as the kernel 206, ktrig facility 212, and/or ktrig control 214) may be programmed by use of known programming techniques and may be based upon any suitable programming language such as for example, C, C++, PASCAL, ADA, COBOL, FORTRAN, or derivatives thereof or other suitable programming languages.

Figure 3A:
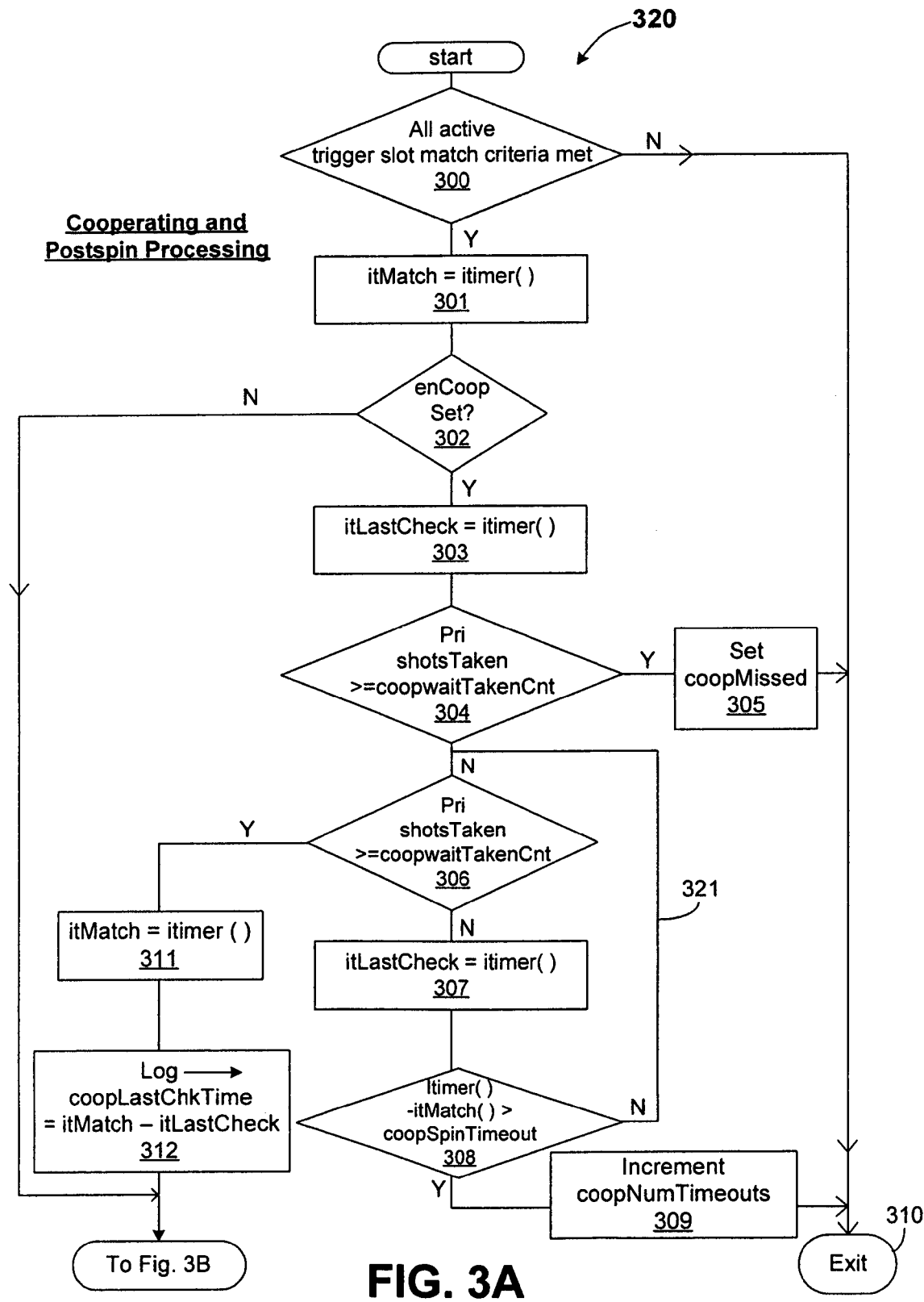
FIGS. 3A and 3B are block diagrams showing a method for cooperating and post-synchronization spin processing, in accordance with an embodiment of the invention.
Figure 3B:
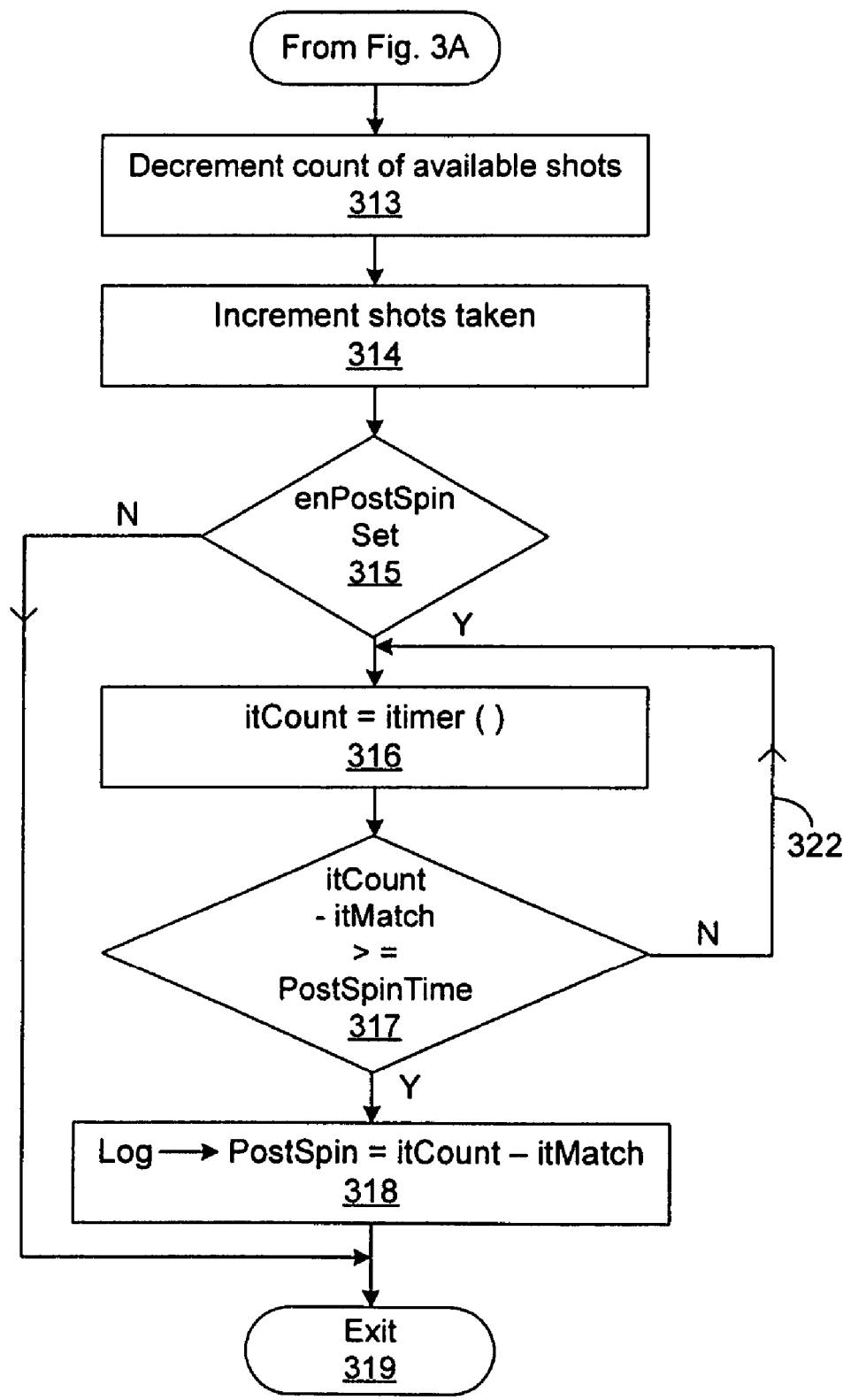

FIGS. 3A and 3B are block diagrams showing a method 320 for cooperating and post-synchronization spin processing, in accordance with an embodiment of the invention. The slave triggers and primary triggers will execute particular steps in FIGS. 3A-3B, as discussed in detail below. It is also noted that a trigger may alternatively be used to simulate corner case conditions during software execution, as disclosed in commonly-assigned pending U.S. patent application Ser. No. 09/709,388, entitled "SOFTWARE TRIGGER FACILITY FOR CODE TESTING AND USE THEREOF", which is hereby fully incorporated herein by reference.

The method 320 is typically called from the code-under-test 208 (FIG. 2). The CUT 208 is typically a portion of code within the kernel 206. In alternative embodiments, the CUT 208 may be a portion of code of software in the user layer 204. Only the slave triggers will spin during the synchronization procedure. As shown below in FIG. 3B, both the primary trigger and slave trigger can perform post synchronization spinning, which is used normally to skew the execution of two previously synchronized primary and slave triggers.

In step (300), a check is made to determine if all active trigger match criteria are met. Step (300) controls the situation when a trigger is taken or not taken.

If, in step (300), all active trigger slot match criteria is not met, then the method 320 exits in block 310, and the method 320 will continue to look for other active trigger slots where the match criteria is met. Further information about this matching criteria is available in pending U.S. patent application Ser. No. 09/709,388.

If, in step (300), the match criteria was met, then in step (301), a variable, itMatch, is set. The itMatch variable indicates a current interval time value which is tracked in a very accurate counter in most central processing units (CPUs). Typically, the itMatch value is incremented by 1 for each cycle (clock). For clarity, this implementation shows the interval time being obtained by calling a function named itMatch( ). On most microprocessors, this time can be obtained by running a single machine instruction. Thus in real implementations, what is shown as a function call to itimer( ), is typically implemented as an inline assembler instruction. Therefore, in step (301), a match time (itMatch) is recorded when all the match criteria was met for a cooperating trigger. Note that in step (311), a time is recorded again when all the match criteria is met for a slave trigger. Since an additional match criteria is met in step (306), the match time, itMatch, is recorded again in step (311) and the previous match time, itMatch, in step (301) is discarded.

In step (302), a check is made if cooperating triggers are enabled. The attribute, enCoop, in a trigger slot 213 will enable a cooperating trigger when enCoop is set. A primary trigger will not have the attribute enCoop set, and will behave as a standard trigger. Therefore, for a primary trigger, the method 320 will proceed from step (302) to step (313) in FIG. 3B. For the primary trigger, in step (313) the count of available shots is decremented, and in step (314) a variable indicating total number of shots taken by the primary trigger is incremented. When the primary trigger takes a shot, the total shots taken count of the primary trigger will increase. In step (315), the primary trigger will then enter post-synchronization spin processing if its enPostSpin attribute is set. If enPostSpin is set for a primary trigger, then the primary trigger will perform post synchronization spinning for an amount of time specified by a postSpinTime attribute for the primary trigger. Note also that if enPostSpin is set for a slave trigger, then the slave trigger will perform post synchronization spinning for an amount of time specified by a postSpinTime attribute for the slave trigger.

While the above process is occurring, a slave trigger, which has all active trigger slot match criteria met in step (300) in FIG. 3A and has an enCoop variable set in step (302), will proceed from step (302) to step (303). In step (303), the slave trigger calls the itimer( ) function to obtain a time (itLastCheck) of the occurrence of the check of how many shots has been taken by the primary trigger.

In step (304), the slave trigger will check if the shots taken by the primary trigger ("pri shotsTaken") is greater than or equal to a primary trigger shots taken value (coopWaitTakenCnt) that the slave trigger waits for. Therefore, in the synchronization spinning performed by steps 306, 307, 308, and feedback path 321, the slave trigger is spinning and will wait until the primary trigger has taken a number of shots that is equal to or greater than coopWaitTakenCnt which is an attribute stored in the active trigger slots. In step (304) and step (306), the slave trigger determines if a transition occurs in the shots taken by the primary trigger. In other words, in order for the slave trigger to synchronize with the primary trigger, the slave trigger has to observe a shots taken value by the primary trigger that is less than coopWaitTakenCnt, and then observe a shots taken value by the primary trigger that is equal to or greater than coopWaitTakenCnt. If the slave trigger does not observe the transition, then the primary trigger has taken the number of shots the slave trigger is to wait for before the slave trigger has entered the synchronization loop, and as a result, the slave trigger will not be able to synchronize with the primary trigger.

If, in step (304), pri shotsTaken>=coopWaitTakenCnt, then a variable "coopMissed" is set to true in step (305). Setting coopMissed to true indicates that the primary trigger had entered its spin loop before the slave trigger had entered its spin loop, and synchronization is not possible because the slave trigger has missed in observing the transition, and the slave trigger then exits at step (310).

If, in step (304), pri shotsTaken<coopWaitTakenCnt, then in step (306), a check is again performed if pri shotsTaken>=coopWaitTakenCnt is true or false. If, in step (306), pri shotsTaken>=coopWaitTakenCnt is false, then the slave trigger has not yet observed the transition in the shots taken value (of the primary trigger) to be synchronized on, since the shots taken value has not equaled or exceeded the coopWaitTakenCnt threshold value. The slave trigger may have seen many transitions. For example, assume that the slave trigger enters that synchronization loop with the primary trigger having taken 2 shots, but the slave trigger is waiting for 5 shots to be taken. It is likely that the slave trigger will see the transition from 2 to 3 shots taken and also from 3 to 4 shots taken. For this case, the slave trigger is only interested in transition to or beyond 5 shots taken. If, in step (306), pri shotsTaken>=coopWaitTakenCnt is false, then in step (307), the slave trigger calls the itimer( ) function to obtain a time (itLastCheck) of the occurrence of the check of how many shots has been taken by the primary trigger.

In step (308), a check is made if itimer( )−itMatch>coopSpinTimeOut. The value of itimer( ) was previously determined in step (307), while the value of itMatch( ) was previously determined in step (301). The attribute coopSpinTimeOut is stored in the active trigger slot. The check performed in step (308) controls the maximum amount of time that the slave trigger can spend in the loop formed by steps (306-308) and feedback path 321. The slave trigger preferably performs synchronization spinning in this loop without any system interrupts disabled, so that pending interrupts do not accumulate while the slave trigger performs this loop.

If, in step (308), itimer( )−itMatch>coopSpinTimeOut is true, then the slave trigger proceeds to step (309) where the value of an active trigger slot attribute, coopNumTimeOut, is incremented, and the slave trigger then exits in step (310). It is possible that the slave trigger can again spin, in a future attempt to synchronize with the primary trigger.

In contrast, note that in previous step (305), the slave trigger had seen the primary trigger take a number of shots that is equal to or greater than the shot threshold amount of coopWaitTakenCnt. Therefore, in step (305), the slave trigger is entered after the primary trigger is entered, and the slave trigger sees that the primary trigger has already taken the number of shots that the slave trigger was requested to synchronize on. This is a missed synchronization condition, which is reported up to the testcase code. The testcase code can then normally retry the operation to synchronize the triggers, in order to enable the code paths to execute in the correct order.

If, in step (308), itimer( )−itMatch>coopSpinTimeOut is false, then the slave trigger will again check in step (306) if pri shotsTaken>=coopWaitTakenCnt is true or false.

If, in step (306), pri shotsTaken>=coopWaitTakenCnt is true, then the slave trigger has observed a transition in the shots taken value of the primary trigger, since the shots taken value has now equaled or exceeded the coopWaitTakenCnt threshold value, and the slave trigger proceeds to step (311). When the slave trigger sees this transition, the slave trigger is permitted to enter post-synchronization spin processing.

Therefore, the slave trigger spins and watches the total number of shots taken by the primary trigger. The slave trigger will synchronize on this total shots taken value in the primary trigger.

In step (311), a current interval time value, itMatch, is obtained by running the function, itimer( ), since a match criteria was met in step (306).

In step (312), a logged value, log[coopLastChkTime], is made. This logged value indicates the time amount that the slave trigger spends in the loop formed by steps (306-308) and feedback path 321. This logged value is calculated as follows: log [coopLastChkTime=itMatch−itLastCheck]. The value of itMatch is the time when the slave trigger sees a primary trigger shots count greater than or equal to (>=) the coopWaitTakenCnt value. The value of itLastCheck is the time when the slave trigger sees a primary trigger shots taken count is less than coopWaitTakenCnt value. As discussed previously, the itMatch value was previously calculated and updated in step (311), while the itLastCheck value was previously calculated and updated in step (307).

The following discusses an example when the itLastCheck value used by step (312) comes from the itLastCheck value in step (303), instead of the normal source of step (307). Both of the steps (304) and (306) are checks for whether the primary trigger has taken the number of shots to be synchronized on. Although rare, it is possible for the first time the check at step (306) is performed, for the check to indicate that the number of shots desired has been taken. This is a rare occurrence because the check at step (304) is made just before this first execution of step (306). This condition only happens if the number of primary shots taken has changed between the sequential operation of these two checks at steps (304) and (306), normally a very short period of time.

When the first time step (306) is executed and step (306) causes the path to step (311) to be taken, step (307) will have never been executed. In this case, the value of itLastCheck used by step (312) comes from step (303), instead of the normal source of step (307).

The logged value in step (312) indicates the time that the slave trigger traversed through the loop formed by steps (306-308) and feedback path 321. Ideally, this time value is very brief, and typically less than approximately 50 cycles. The test case can then read the log value calculated in step (312), so that a determination is made if timing requirements are met. Typically, time values are internally maintained as count values (integer values), and the kernel will convert the count values into floating point values for the user level interface in response to a query via the user level interface.

The slave trigger then proceeds to step (313) in FIG. 3B.

As an example, if the slave trigger is waiting for the primary trigger shots taken value to equal or exceed 5 cycles, then the slave trigger will spin through the loop formed by steps 306-308 and feedback path 321. After the primary trigger has taken 5 shots (executed at step (314) in FIG. 3B), then the slave trigger will execute steps 311 and 312 and then execute steps 313, 314, and 315.

The time that the slave trigger and primary trigger spends in the post-synchronization spin loop (which is formed by steps (316-317) and feedback path 322) is determined by the time when itMatch was set and by the postSpinTime for each of the primary trigger and the slave trigger. Note that the primary trigger sets itMatch in step (301), and the slave trigger sets the itMatch in steps (301) and (311). Note that slave triggers that have made it to postspin processing, will have always executed in step (311), which writes over the time obtained by step (301). Thus for slaves in postspin processing, the value in itMatch was obtained by step (311).

If the attribute enPostSpin is set for a trigger, then post-synchronization spin processing is enabled for the trigger. If enPostSpin is not set in step (315), then a trigger will exit in step (319). If enPostSpin is set for a trigger, then the trigger will obtain a current time (itCount) in step 316 by calling the itimer( ) function.

In step (317), the trigger checks if the current time (itCount) minus itMatch is equal to or greater than the attribute postSpinTime which is the amount of time after trigger is taken to spin. If itCount−itMatch>=postSpinTime is false, then the trigger loops back via feedback path 322 to step (316) and the current time itCount is again obtained. If itCount−itMatch>=postSpinTime is true, then the time taken in postspin processing is logged by step (318) and then the trigger exits in step (319). This time value is equal to the difference between itCount and itMatch.

Therefore the processing in FIGS. 3A-3B is used two synchronize the slave trigger with the primary trigger. The slave trigger will spin until the slave trigger observes that the primary trigger has taken a specified number of shots. Then, both triggers would synchronize in the post-synchronization spin logic that performs that processing in FIG. 3B. To obtain a relatively close amount of synchronization between the two triggers, the post-synchronization spin processing utilizes the itMatch value that was recorded in step (301) by the primary trigger and recorded in step (311) by the slave trigger.

Positive skew values can be set between the primary trigger and the slave trigger. As an example, if a skew of 1 millisecond is desired between the primary trigger and the slave trigger (i.e., the slave trigger will exit the post-synchroniza-tion spin loop at 1 millisecond after the primary trigger had exited the post-synchronization spin loop), then the primary trigger may be set up with a postSpinTime of 10 milliseconds and the slave trigger may be set up with a postSpinTime of 11 milliseconds.

Negative skew values may also be set between the primary trigger and the slave trigger. As an example, the primary trigger may be set up with a postSpinTime of 10 milliseconds and the slave trigger may be set up with a postSpinTime of 9 milliseconds. Therefore, the slave trigger will exit the post-synchronization spin loop before the primary trigger had exited the post-synchronization spin loop.

The positive and negative skews that may be set between the primary trigger and slave trigger is useful in butterfly testing. For example, the skew between the triggers may initially be set at zero. The skew values can be incremented in positive values (various positive skew values) and incremented in negative values (various negative skew values) from the central point value of zero skew, in order to test for proper locking in the code.

Therefore, these cooperating test triggers allow two arbitrary kernel-level code paths to be executed with any relative negative, positive, or zero skew. It is noted that an embodiment of the invention is not limited to the synchronization of only two code paths by use of only two test triggers. Three or more code paths may be synchronized together by use of three or more test triggers. Furthermore, even the same trigger can be synchronized multiple times on an multi-processor system. For example, multiple executions of the write system call could be synchronized.

The post synchronization delay time is left up to the test developer to determine, and depends on whether the test developer is searching for misplaced or missing locks. In the case of misplaced locks, the test case searches for abrupt changes in behavior. These abrupt changes are what are known as a knife-edge. The testcase then uses cooperating triggers to perform significant amounts of testing at skew times around the knife-edge.

The other case is a test for missing locks. In this case the test case measures the amount of time where no abrupt changes in behavior have occurred. These areas of no abrupt changes in behavior occur in areas that do not contain locks. The test case then splits up this range of no changes into an evenly spaced set of skew values for testing. For example, the interval might get split up into 1000 evenly spaced skew values. The test case then uses cooperating triggers to test each of the evenly spaced skews.

The accuracy of the cooperating triggers allows two paths to be skewed so that specified locking windows can be targeted.

In reducing the skew (between the code paths) down to about 20 clocks at approximately 31% of the time, solutions to two significant issues were resolved by an embodiment of the invention. The first issue was that just after exiting the post synchronization delay loop by a thread of execution, a clock interrupt was almost always taken (processed). As known to those skilled in the art, a clock interrupt is an "interrupt signal" generated by the computer's internal electronic clock. An "interrupt signal" is a signal received by the computer's central processing unit that causes a temporary halt in the execution of a program while some other task is performed. Interrupts may be generated by the computer's internal electronic clock (clock interrupt signal), by an input or output device, or by a software routine. After the computer has completed the task to which it was diverted, control returns to the original program.

A clock interrupt signal is almost always taken after the thread exits the post synchronization delay loop because interrupts were disabled when the thread is in the post synchronization delay loop. The post synchronization delay loop is implemented by use of a test trigger mentioned above. If the thread spends even a short period of time in the delay loop with the interrupts disabled, there would be an accumulation of pending interrupt signals that are awaiting to be taken. The processing of all the pending interrupts would occur as soon as the post synchronization delay loop prepares to exit. Just before exiting, the KTRIG facility must restore the state that was present on entry. Typically triggers are called with interrupts enabled, so part of restoring the state would re-enable interrupts. The solution to this first issue was for the thread to spin in the delay loop with the interrupts enabled and log how much time was actually taken in the post synchronization delay loop, step 318 (FIG. 3B. It is then left to the test case program 216 (FIG. 2) to compare the requested post synchronization delay time with the actual post synchronization delay time that occurred, and retry the test process if the actual post synchronization delay time is not close to the requested post synchronization delay time. The amount for the post synchronization delay time is determined in step (318) in FIG. 3B. Through an IOCTL, a trigger control program can query the state of an active trigger slot. The results of this query will contain the post synchronization delay time value written by step (318).

As known to those skilled in the art, a spinlock is a lock where the thread simply waits in a loop (i.e., the thread "spins"), so that the thread repeatedly checks until the lock becomes available. Spinlocks are very efficient if threads are only likely to be blocked for a short period of time, as they avoid the overhead of operating system process re-scheduling. For this reason, spinlocks are often used within an operating system kernel in circumstances where the spinlocks are likely to be efficient. A lock is a mechanism for enforcing limits on access to a resource in an environment where there are many threads of execution. As mentioned above, locks are one way of enforcing concurrency control policies.

The second issue is with the non-deterministic time that is needed to acquire and release a spinlock. In an implementation, the spinlock is acquired before and released after step (318). This was performed in order to write a log entry that indicates the conditions by which the test trigger was taken. For example, there is a need to write how long the thread had actually spent in the post synchronization delay loop. The portions of the spinlock code path that are in the I-cache (instruction cache) are fairly non-deterministic. These particular portions in the I-cache are mostly dependent on which particular interrupts were processed during the synchronization and post-synchronization spin delay loops. As a result, the amount of time that is needed to acquire a spinlock and release the spinlock is fairly non-deterministic.

A solution to this second issue is by adding a flag to a log entry that indicates that the log entry is a partial log entry. This flag is set with the spinlock held before the thread starts the time critical post synchronization delay loop. All code paths that query log entries consider a log entry to be invalid if this partial flag is set. Upon the thread's exit from the post synchronization delay loop, the final results of the log entry are written in memory (e.g., memory 106 in FIG. 1) and the partial flag is cleared without even re-obtaining the spinlock. This allows the final creation of the log entry to be performed in a fairly deterministic amount of time and with a minimized amount of disturbance to the I-cache.

The various facilities, engines, tools, or modules discussed herein may be, for example, software, firmware, commands, data files, programs, code, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for providing cooperating triggers, the method comprising:

determining if a match criteria for a slave trigger and a match criteria for a primary trigger are met;

executing the slave trigger and the primary trigger if the match criteria are met;

waiting for a transition in a total number of shots taken by the primary trigger so that the slave trigger performs synchronization spinning, wherein the slave trigger waits for the transition from a first value below a threshold value to a second value above the threshold value;

if the slave trigger detects the transition, then exiting the synchronization spinning by the slave trigger and entering into post-synchronization spin processing by the slave trigger; and if the slave trigger detects the second value and does not detect the first value, then reporting a missed synchronization condition from a kernel layer to a user layer.

2. The method of claim 1, wherein the primary trigger and slave trigger are used to detect improper locking in a code.

3. The method of claim 1, wherein the slave trigger will exit from synchronization spinning when a coopSpinTimeOut value is exceeded.

4. The method of claim 1, further comprising:
performing post synchronization spinning by the primary trigger and the slave trigger.

5. The method of claim 4, wherein the slave trigger can perform post synchronization spinning after observing the transition in a total number of shots taken by the primary trigger.

6. The method of claim 4, wherein the primary trigger will perform post synchronization spinning for an amount of time specified by a postSpinTime attribute for the primary trigger.

7. The method of claim 4, wherein the slave trigger will perform post synchronization spinning for an amount of time specified by a postSpinTime attribute for the slave trigger.

8. The method of claim 4, wherein a skew value between the slave trigger and the primary trigger can be set based on the post synchronization spinning by the triggers.

9. The method of claim 8, wherein the slave trigger and the primary trigger can be set with a positive skew value.

10. The method of claim 8, wherein the slave trigger and the primary trigger can be set with a negative skew value.

11. An apparatus for providing cooperating triggers, the method comprising:
a computer configured to determine if a match criteria for a slave trigger and a match criteria for a primary trigger are met, execute the slave trigger and the primary trigger if the match criteria are met, and wait for a transition in a total number of shots taken by the primary trigger so that the slave trigger performs synchronization spinning, wherein the slave trigger waits for the transition from a first value below a threshold value to a second value above the threshold value;

wherein if the slave trigger detects the transition, then the slave trigger exits the synchronization spinning and enters into post-synchronization spin processing; and wherein if the slave trigger detects the second value and does not detect the first value, then a missed synchronization condition is reported from a kernel layer to a user layer in the computer.

12. The apparatus of claim 11, wherein the primary trigger and slave trigger are used to detect improper locking in a code.

13. The apparatus of claim 11, wherein the slave trigger will exit from synchronization spinning when a coopSPinTimeOut value is exceeded.

14. The apparatus of claim 11, wherein the primary trigger and the slave trigger can perform post synchronization spinning.

15. The apparatus of claim 14, wherein the slave trigger can perform post synchronization spinning after observing the transition in a total number of shots taken by the primary trigger.

16. The apparatus of claim 14, wherein the primary trigger will perform post synchronization spinning for an amount of time specified by a postSpinTime attribute for the primary trigger.

17. The apparatus of claim 14, wherein the slave trigger will perform post synchronization spinning for an amount of time specified by a postSpinTime attribute for the slave trigger.

18. The apparatus of claim 14, wherein a skew value between the slave trigger and the primary trigger can be set based on the post synchronization spinning by the triggers.

19. The apparatus of claim 18, wherein the slave trigger and the primary trigger can be set with a positive skew value.

20. The apparatus of claim 18, wherein the slave trigger and the primary trigger can be set with a negative skew value.

21. An apparatus for providing cooperating triggers, the apparatus comprising:
a computer including a memory for storing a computer program and a processor for executing the computer program;
said computer program comprising:
means for determining if a match criteria for a slave trigger and a match criteria for a primary trigger are met;
means for executing the slave trigger and the primary trigger if the match criteria are met; and
means for waiting for a transition in a total number of shots taken by the primary trigger so that the slave trigger performs synchronization spinning, wherein the slave trigger waits for the transition from a first value below a threshold value to a second value above the threshold value;

wherein if the slave trigger detects the transition, then the slave trigger exits the synchronization spinning and enters into post-synchronization spin processing; and wherein if the slave trigger detects the second value and does not detect the first value, then a missed synchronization condition is reported from a kernel layer to a user layer in the computer.

22. An article of manufacture, comprising:
a computer-readable storage medium having stored thereon instructions to permit a computer system to:
determine if a match criteria for a slave trigger and a match criteria for a primary trigger are met;
execute the slave trigger and the primary trigger if the match criteria are met; and
wait for a transition in a total number of shots taken by the primary trigger so that the slave trigger performs synchronization spinning, wherein the slave trigger waits for the transition from a first value below a threshold value to a second value above the threshold value;
wherein if the slave trigger detects the transition, then the slave trigger exits the synchronization spinning and enters into post-synchronization spin processing; and
wherein if the slave trigger detects the second value and does not detect the first value, then a missed synchronization condition is reported from a kernel layer to a user layer in the computer system.

* * * * *